(12) United States Patent
Ohta

(10) Patent No.: US 7,068,360 B2
(45) Date of Patent: Jun. 27, 2006

(54) OPTICAL SAMPLING WAVEFORM MEASURING APPARATUS

(75) Inventor: Hiroshi Ohta, Yamato (JP)

(73) Assignee: Yokogawa Electric Corporation, Tokyo (JP)

( * ) Notice: Subject to any disclaimer, the term of this patent is extended or adjusted under 35 U.S.C. 154(b) by 409 days.

(21) Appl. No.: 10/197,388

(22) Filed: Jul. 16, 2002

(65) Prior Publication Data

US 2003/0016347 A1    Jan. 23, 2003

(30) Foreign Application Priority Data

Jul. 18, 2001  (JP)  .............................. 2001-218652

(51) Int. Cl.
*G01M 11/00* (2006.01)

(52) U.S. Cl. .................................... 356/124.5
(58) Field of Classification Search ............. 356/124.5
See application file for complete search history.

(56) References Cited

U.S. PATENT DOCUMENTS 5,546,414 A * 8/1996 Pfeiffer ...................... 372/18

6,373,867 B1 * 4/2002 Lin et al. ...................... 372/18

OTHER PUBLICATIONS

M.E. Fermann, et al., "Environmentally Stable Kerr-type Mode-locked erbium Fiber Laser Producing 360-fs Pulses", Optics Letters, vol. 19, No. 1, Jan. 1, 1994, pp. 43-45.
Nobuhide Yamada et al., "Observation of 320-Gb/s Eye Diagram by Optical Sampling System Using a Passively Mode-locked Fiber Laser", Electronics Letters, vol. 37, No. 25, Dec. 6, 2001.
Y. Kawaguchi et al., "Development of 310-GHz Optical Sampling System", TERATEC Corporation R&D.

* cited by examiner

*Primary Examiner*—Hwa (Andrew) Lee
*Assistant Examiner*—Kara Geisel
(74) *Attorney, Agent, or Firm*—Darby & Darby

(57) ABSTRACT

In order to provide an optical sampling waveform measuring apparatus which can measure an ultra-high speed optical signal accurately by using a stable, narrow pulse, and a low timing jitter sampling optical pulse, an optical sampling waveform measuring apparatus is provided with a passive mode-locked fiber ring laser for generating a sampling optical pulse and a cavity length varying device which adjusts the cavity length in a passive mode-locked fiber ring laser.

7 Claims, 5 Drawing Sheets

OPTICAL SAMPLING WAVEFORM MEASURING APPARATUS

BACKGROUND OF THE INVENTION

1. Field of the Invention

The present invention relates to an optical sampling waveform measuring apparatus for measuring an optical waveform in an ultra-short period region where a method using a photoelectric conversion element is impossible. The present invention particularly relates to an optical sampling waveform measuring apparatus which can measure an optical waveform in high timing resolution and in a low timing jitter.

2. Description of Related Art

Conventionally, according to Japanese Examined Patent Application, Second Publication No. Hei. 6-63869, an optical sampling waveform measuring apparatus utilizes a Sum-Frequency Generation (hereinafter called SFG) as a second non-linear optical effect or a Difference-Frequency Generation (hereinafter called DFG) and performs a cross-correlation of an optical pulse having an angular frequency of ($\omega 1$) to be measured and a sampling optical pulse having an angular frequency of ($\omega 2$) of which the pulse width is narrower than a pulse width of an optical pulse having an angular frequency of ($\omega 1$) to be measured in a non-linear optical crystal, and extracts a Sum-Frequency light (hereinafter called SF light) having an angular frequency of ($\omega 1 + \omega 2$).

Photoelectric conversion is performed on the SF light by a receptor such as a photoelectric conversion element, and a waveform as a sampling result is displayed by processing the signal electrically.

Timing resolution the SF light waveform in such an measuring apparatus is limited by a pulse width of a sampling optical pulse to be measured and a variation of the sampling pulse in a time-axis such as a timing jitter.

Also, a cycle frequency of the sampling optical pulse (hereinafter called cycle frequency) synchronizes to a value such as 1/n (n is an integral number) of the cycle frequency of an optical pulse to be measured. Also, in order to perform a sampling of an optical pulse to be measured, it is necessary to delay the sampling timing slightly in a range of pulse width of a sampling optical pulse and shift the cycle frequency entirely.

In general, various methods for generating an optical pulse to be used as a sampling optical pulse exist. In every method, several ps of optical pulse width can be obtained, and several hundreds of fs to several ps of timing jitter can be obtained.

Therefore, in an optical sampling waveform measuring apparatus, in order to improve timing resolution, it is necessary to perform an optical pulse compression to narrow the optical pulse width and reduce the varying range of timing jitter in a time-axis.

For example, in a gain switching method in which a cycle frequency can be controlled very easily, optical pulse width of an optical pulse which is generated is nearly 20 ps and the timing jitter is nearly 5 ps. These values cannot be used for a sampled optical pulse for measuring a waveform of signal light to be measured having a frequency which is more than 100 Gb/s because measurement accuracy may be worsened.

Therefore, the above-mentioned optical pulse compression and reduction of time jitter are performed; thus, a sampling optical pulse having 1 ps of optical pulse width and 160 fs of timing jitter is obtained (Referenced document: Development of 310 GHz optical sampling system, Authors: KAWAGUCHI, NOGIWA, OTA, ENDO, Document No. B-10-149 from Society Meeting of The Institute of Electronics, Information, and Communication Engineers).

An example of a structure of an optical sampling waveform measuring apparatus is shown in FIG. 5.

An electrical signal generator SG1 generates, for example, a periodic electrical signal, and outputs a signal P1 to be measured having a frequency $f_{sig}$ as a cycle frequency. An electrical signal generator SG2 generates, for example, a periodic electrical signal, and synchronizes to a signal P1 to be measured so as to generate a sampling signal P2 having a frequency of "$(f_{sig}/n) - \Delta f$" (n is an integral number) as a cycle frequency.

An amplifier 100 amplifies an input sampling pulse signal P2 and a narrow pulse generator 101 obtains an electrical pulse having narrower pulse width.

A laser oscillator 102 generates an optical pulse having short pulse width by the above-mentioned electrical pulse with a gain switch method. An optical circulator 103 inputs a continuous light which is generated in a laser oscillator 104 (CW light) to a laser oscillator 102 in order to reduce a timing jitter of the sampling optical pulse, and outputs an optical pulse P3 which is generated by a laser oscillator 102.

A DCF (dispersion compensating fiber) 105 performs a linear compression to above-mentioned optical pulse P3. An EDFA (Erbium-doped fiber amplifier) 106 amplifies the optical pulse P3 which is linearly compressed. A DSF (dispersion shift fiber) 107 extends an inputted optical pulse P3 in a rectangular shape.

Next, an optical amplifier 108 amplifies an optical pulse P3 which is transformed in a rectangular shape and performs a pulse compression and controls a polarization direction of an optical pulse P3 by a polarization direction controller 109 and outputs as a sampling optical pulse P4.

Also, an MLFRL (mode-locked fiber ring laser) 110 synchronizes to a frequency of a signal P1 to be measured and generates an optical pulse P6.

An optical intensity modulator 112 modulates an optical pulse P6 by a predetermined pattern (data row made of 0 (zero) and 1 (one)) which a pattern generator 111 synchronizes to a signal P1 to be measured and outputs an optical pulse P7 which is modulated.

An optical amplifier 113 amplifies an optical pulse P7, and a polarization controller 114 controls a polarization direction of an optical pulse P7 which is input, and outputs as an optical pulse P8.

A polarization beam splitter 115 mixes an optical pulse P8 and a sampling optical pulse P4 and outputs a multiplied optical pulse P9.

A non-linear optical crystal element 116 is made from a non-linear optical member. When a phase matching of a sampling optical pulse P4 and an optical pulse P8 is completed in an optical pulse P9, a non-linear optical crystal element 116 emits an SF light as a cross correlation signal of these two optical pulses.

A receptor 118 is a photoelectric conversion element such as an avalanche photodiode, and performs photoelectric conversion of an input SF light and outputs as a detection signal PS.

An A/D converter 119 converts peak voltage of an input detected signal PS to a digital value according to a predetermined timing and outputs.

A computer 120 performs processing of the above-mentioned digital value, generates an eye-pattern, displays such image of the eye-pattern in a display section, and evaluates the property of a signal light waveform (optical pulse P7) to be used for a communication.

However, in an optical sampling waveform measuring apparatus as shown in FIG. 5, when the optical pulse compression method is used, optical property is unstable because the temperature of a narrow pulse generator 101 as a semiconductor element and a laser oscillator 102 varies. Therefore, there is a problem in the stability of the optical property, and although an optical property of a timing jitter has improved to some degree, it is still unsatisfactory for obtaining better time resolution.

Therefore, in order to obtain an optical sampling waveform measuring apparatus having high time resolution and low timing jitter, a sampling optical pulse having a narrow pulse width and a low timing jitter is necessary. However, according to a current method utilizing optical pulse generating method in which a present semiconductor element, it is difficult to obtain a short optical pulse stably.

SUMMARY OF THE INVENTION

The present invention was made in consideration of such a problem. An object of the present invention is to provide an optical sampling waveform measuring apparatus which can measure an ultra high-speed optical signal precisely by using a stable sampling optical pulse having a narrow pulse width and low timing jitter.

A first aspect of an optical sampling waveform measuring apparatus of the present invention is characterized in comprising electrical signal generators, polarization direction controllers, a mode-locked fiber ring laser, a pattern generator, an optical intensity modulator, an optical amplifier, a polarization beam splitter, a non-linear optical crystal element, an A/D converter, and a computer. Also, an optical waveform of a signal light to be measured is measured by sampling the signal light to be measured by utilizing a non-linear optical effect of sampling optical pulse of which optical pulse width is narrower than the optical pulse width of a signal light to be measured, and a passive mode-locked fiber ring laser is used to generate the sampling optical pulse.

A second aspect of an optical sampling waveform measuring apparatus of the present invention is characterized in that a reflecting mirror in a resonator in the passive mode-locked fiber ring laser is made of a saturable absorber.

A third aspect of an optical sampling waveform measuring apparatus of the present invention is characterized in that a saturable absorber in a passive mode-locked fiber ring laser is a semiconductor saturable absorber.

A fourth aspect of an optical sampling waveform measuring apparatus of the present invention is characterized in that a cavity length varying device which adjusts the cavity length is provided in a passive mode-locked fiber ring laser.

A fifth aspect of an optical sampling waveform measuring apparatus of the present invention is characterized in that a cavity length varying device in a passive mode-locked fiber ring laser comprises a coarse motion adjusting section which performs coarse varying operation and a fine motion adjusting section which performs fine varying operation.

An optical sampling waveform measuring apparatus according to the present invention can measure an ultra-high speed optical signal waveform in high timing resolution and a low timing jitter stably by using a cycle frequency variable passive mode-locked fiber ring laser as a sampling optical pulse generator when sampling operation is performed by a sampling light while utilizing a non-linear optical effect.

That is, in an optical sampling waveform measuring apparatus according to the present invention, a passive mode-locked fiber ring laser generates a sampling optical pulse in a low timing jitter stably. Furthermore, a fine motion adjusting section adjusts a cavity length of a passive mode-locked fiber ring laser spontaneously according to a timewise fluctuation so as not to cause a difference between a cycle frequency of a sampling optical pulse of a passive mode-locked fiber ring laser and a cycle frequency of a sampling reference signal which is output from an electrical signal generator. By doing this, a cycle frequency of a sampling optical pulse is adjusted to be synchronized to a cycle frequency of a sampling reference signal; therefore, it is possible to measure an optical waveform in a low timing jitter and high timing resolution. Also it is possible to measure an optical waveform in signal speed, such as on the order of terabits.

DETAILED DESCRIPTION OF THE INVENTION

Figure 1:
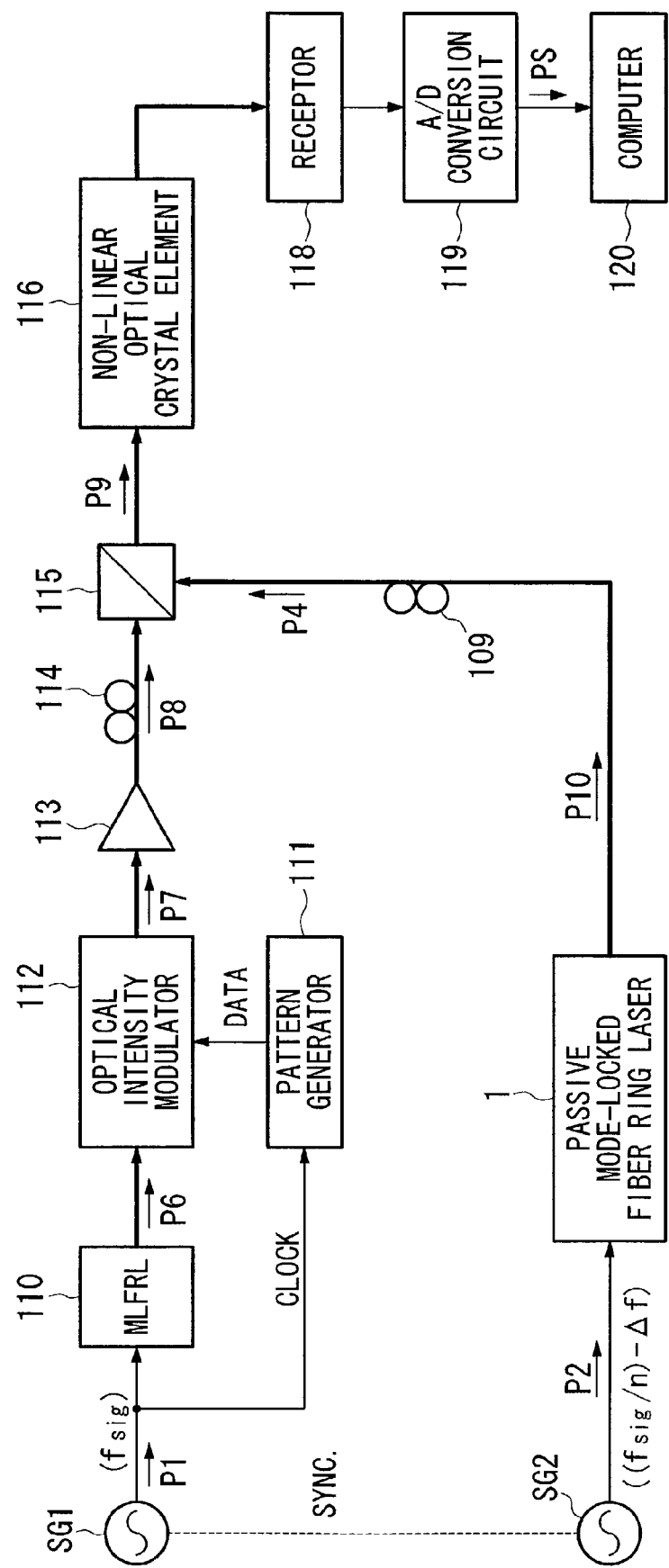
FIG. 1 is a block diagram showing a first embodiment of an optical sampling waveform measuring apparatus.
Figure 2:
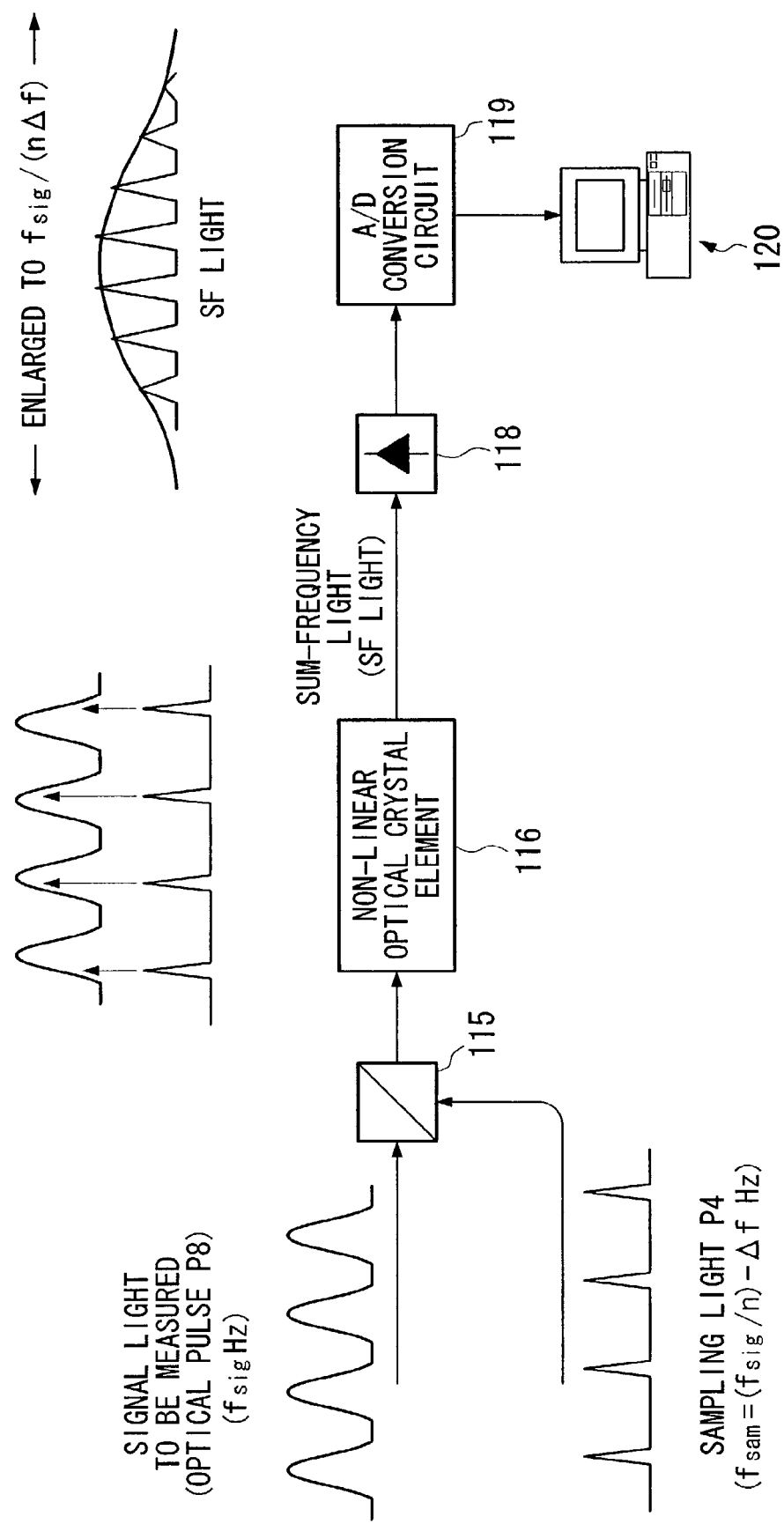
FIG. 2 is a view showing schematically an optical sampling waveform measuring apparatus according to the present invention.

Embodiments of the present invention are explained with reference to drawings as follows. FIG. 1 is a block diagram of a first embodiment of an optical sampling waveform measuring apparatus. FIG. 2 is a view for schematically explaining an optical sampling waveform measuring apparatus which is used in the present invention.

Figure 5:
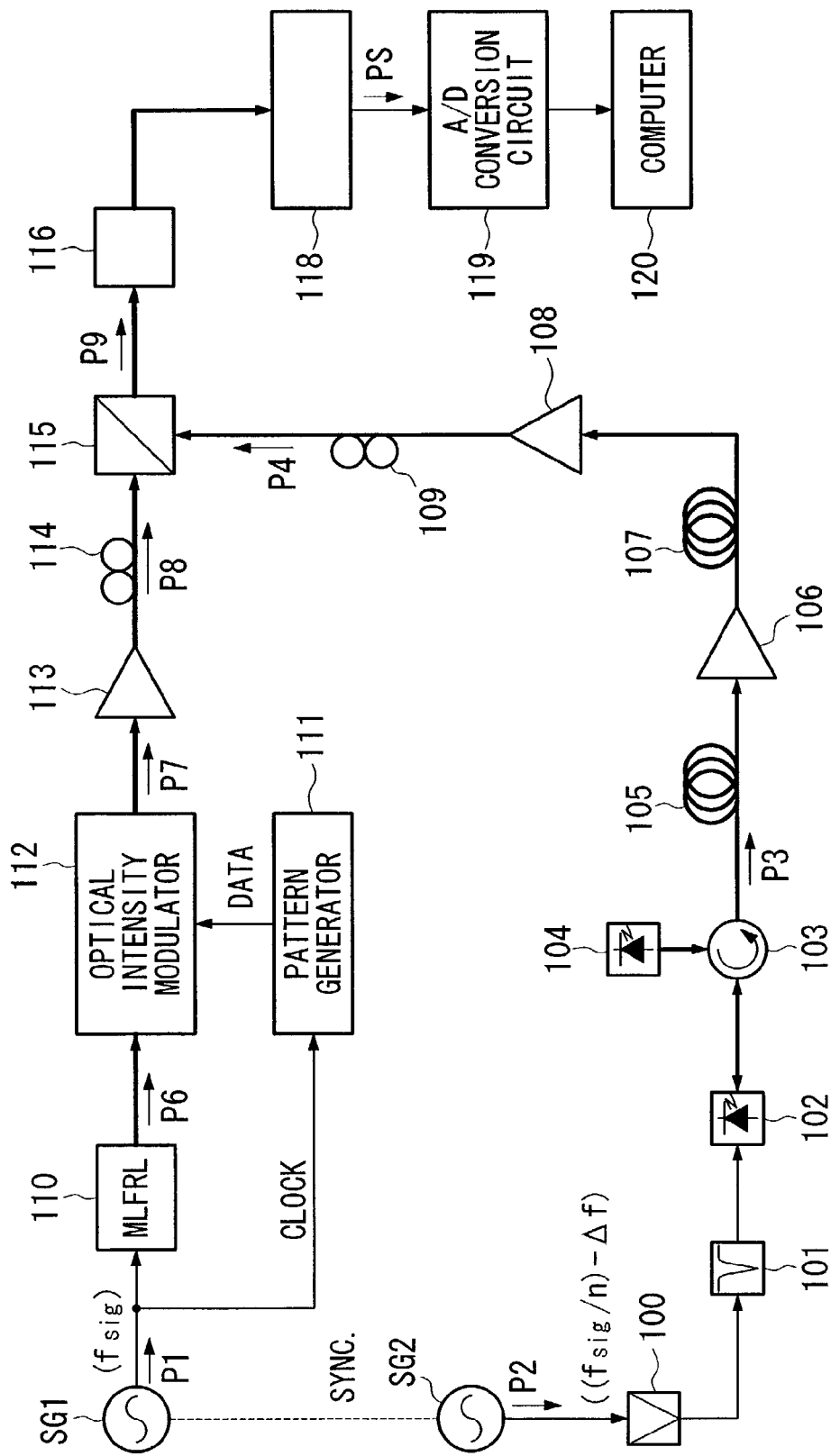
FIG. 5 is a block diagram showing a conventional optical sampling waveform measuring apparatus.

In FIG. 1, same reference numerals are added to same devices and signals as the case of a conventional optical sampling waveform measuring apparatus shown in FIG. 5. Particularly, a device which generates a signal light P8 to be measured is common between the present invention and the conventional apparatus.

Here, a measuring theory of an optical sampling waveform measuring apparatus of the present invention is explained with reference to FIG. 2.

In FIG. 2, a signal light (optical pulse P8) to be measured having a cycle frequency "$f_{sig}$" and a sampling optical pulse P4 having a cycle frequency "$(f_{sig}/n)-\Delta f$" (n is an integral number) which is several hundreds of Hz to several kHz lower than a value such as 1/n of a cycle frequency "$f_{sig}$" (n is an integral number) are multiplied by a polarization beam splitter (PBS) 115 so as to be incident on a non-linear optical crystal (for example, KTP ($KTiOPO_4$, etc.)) element 116.

In a non-linear optical crystal element 116, SF light (Sum-Frequency Generation light, etc.) can be generated by a phase-matching only when both a signal light P8 to be measured having angular frequency $\omega 1$ and a sampling optical pulse P4 having angular frequency $\omega 2$ are incident by a non-linear optical effect such as Sum-Frequency Generation.

At this time, if pulse width of a sampling optical pulse P4 is narrower than a pulse width of a signal light P8 to be measured, sufficiently, the above-mentioned signal light P8 to be measured is sampled in equal time interval due to a sampling theory.

As a result, a receptor 118 receives an SF light such as a Sum-Frequency light, performs photoelectric conversion, and outputs a detection signal PS similarly to the conventional case shown in FIG. 5.

An A/D converter 119 converts the above-mentioned detection signal PS to a digital value, and a computer 120 displays a waveform; thus, an optical waveform of a signal light P8 to be measured can be measured in a form of an eye-pattern (a waveform of cycle frequency "$f_{sig}$" is enlarged to a cycle frequency "$(f_{sig}/(n\Delta f))$" so as to measure a waveform).

When a timing jitter exists in a sampling optical pulse P4, a signal light P8 to be measured is measured such that sampling interval shifts according to a time shift of a sampling pulse due to a timing jitter.

However, data-processing operation is performed such that a computer 120 does not adjust the shift of sampling interval (not take the shift of sampling interval into account) and an A/D converter 119 performs sampling operation in equal interval.

Therefore, data-processing is performed such that a timing jitter exists in a signal light P8 to be measured; thus, it is impossible to measure an optical property of a signal light P8 to high accuracy.

According to the above reasons, generating a sampling optical pulse P4 having a low timing jitter in a tolerable range according to a signal light P8 to be measured is a very important factor in order to measure a signal light P8 in high accuracy.

Also, a time resolution for measuring an optical sampling waveform almost entirely depends on width of an optical pulse of a sampling optical pulse P4; thus, generating a sampling optical pulse having narrow pulse width is also an important factor.

The present invention is characterized in that a passive mode-locked fiber ring laser having a low timing jitter and a narrow pulse width is used to generate the sampling optical pulse.

Also, in a passive mode-locked fiber ring laser, a reflecting mirror which is used in a resonator is a saturable absorber; thus, it is possible to remove an optical pulse component such as a noise light having low energy and generate an optical pulse having a necessary energy. Therefore, it is possible to generate a sampling optical pulse P4 stably.

Also, it is necessary that a cycle frequency of a sampling optical pulse P4 should be shifted slightly "$\Delta f$" by 1/n of a cycle frequency of a signal light P8 to be measured ("$f_{sam}= (f_{sig}/n)-\Delta f$" ) as shown in FIG. 2.

Therefore, an optical sampling waveform measuring apparatus of the present invention has to be operated according to various cycle frequencies of signal light P8 to be measured. For that purpose, an optical sampling waveform measuring apparatus of the present invention is provided with a light delaying device (a cavity length varying device) in a passive mode-locked fiber ring laser so as to vary a cycle frequency with which a sampling optical pulse P4 is output.

By doing this way, an optical sampling waveform measuring apparatus of the present invention can measure an optical waveform of a signal light P8 to be measured with low timing jitter and high timing resolution.

Next, details of an optical sampling waveform measuring apparatus according to a first embodiment of the present invention are explained with reference to FIG. 1.

First, in order to generate a signal light P8 to be measured, an electrical signal generator SG1 outputs an electrical signal having "10 GHz" of cycle frequency $f_{sig}$ as a signal light P1 to be measured.

An MLFRL 110 is excited by an inputted signal light P1 to be measured and generates an optical pulse P6 as an optical pulse row according to 10 GHz of cycle frequency $f_{sig}$.

Next, a pattern generator 111 and a light intensity modulator 112 perform data modulation to 10 Gb/s optical signal row of an optical pulse P6 and outputs optical pulse P7.

An optical amplifier 113 performs optical amplification to an input optical pulse P7 and outputs a signal light P8 to be measured having angular frequency ω1 via a polarization controller 114.

Next, in order to generate a sampling optical pulse P4 having an angular frequency ω2, an electrical signal generator SG2 generates synchronizes an electrical signal having a cycle frequency which is represented by a formula such as "$(f_{sig}/n)-\Delta f$" (n is an integral number) while synchronizing to a signal light P1 which is output from an electrical signal generator SG1. For example, such a cycle frequency may be in a range of 50 MHz to 100 Hz. An electrical signal generator SG2 outputs a sampling reference signal P2 to a passive mode-locked fiber ring laser 1.

A passive mode-locked fiber ring laser 1 emits an optical pulse P10 having a cycle frequency of "$(f_{sig}/n)-\Delta f$" and a low timing jitter and a narrow pulse width according to a sampling reference signal P2 stably.

Here, in a passive mode-locked fiber ring laser 1, an active element is not used. Therefore, optical property of passive mode-locked fiber ring laser 1 becomes stable; thus, an optical pulse 10 is output stably.

A polarization direction controller 109 controls a polarization direction of the above-mentioned optical pulse P10 which is incident thereto according to a polarization direction of a polarization beam splitter, and emits a sampling light P4.

A polarization beam splitter (PBS) 121 mixes a sampling optical pulse P4 and a signal light P8 to be measured and emits to a non-linear optical crystal element 116 such as KTP.

By doing this way, a non-linear optical crystal element 116 performs optical sampling by converting to a Sum-Frequency light by a non-linear optical effect.

A receptor 118 performs photoelectric conversion to an incident SF light. An A/D converter 119 and a computer 120 performs waveform processing to a signal of SF light which is converted photo-electrically.

As described above, it becomes possible to measure a waveform of a signal light P8 to be measured accurately with high timing resolution which is output from an optical intensity modulator 112 with ultra-high speed by using a passive mode-locked fiber ring laser 1.

Figure 3:
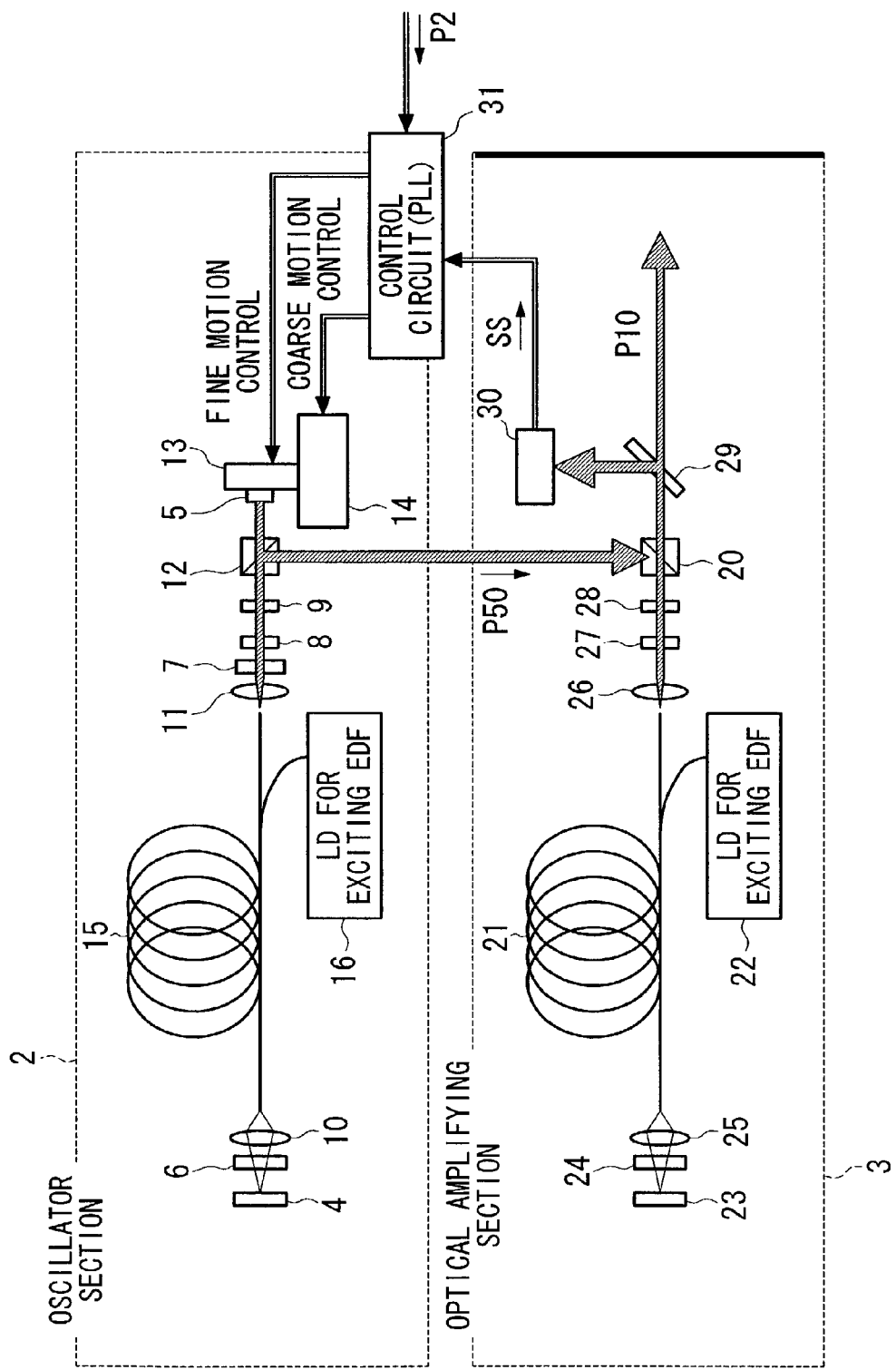
FIG. 3 is a block diagram showing a passive mode-locked fiber ring laser shown in FIGS. 1 and 4.

Next, a passive mode-locked fiber ring laser 1 according to the present invention is shown in FIG. 3.

A detailed theory of a passive mode-locked fiber ring laser is disclosed in "M. E. Fermann, L. M. Yang, M. L. Stock and M. J. Andrejco: 'Environmentally Stable Kerr-Type Mode-locked Erbium Fiber Laser Producing 300 fsec Pulses', Opt. Lett., Vol.19, pp. 43–45, 1994".

A passive mode-locked fiber ring laser 1 comprises a oscillating section 2 and an optical amplifying section 3.

In an oscillating section 2, optical amplification is performed by an Erbium-doped optical fiber (EDF) 15 and a laser diode (LD) 16 for exciting an EDF. Amplified light is reflected by a mirror 4 and a saturable absorber mirror 5 which are disposed at both ends of an oscillating section 2, and an optical pulse oscillates in self-oscillating manner with a cycle frequency which is determined by a cavity length (a distance between a mirror 4 and a saturable absorber 5).

Also, in a passive mode-locked fiber ring laser 1 according to the present invention, polarization state of an optical pulse is stabilized by Faraday rotators 6 and 7, wavelength plates 8 and 9, lenses 10 and 11, and polarization beam splitter (PBS) 12.

Here, it is possible to remove a low energy optical pulse component which may become a noise light by using a saturable absorber mirror 5 as a reflecting mirror at one end of a resonator. By doing this way, a self-oscillation of an optical pulse having a necessary cycle frequency is stabilized.

In a resonator (disposed between a mirror 4 and a saturable absorber mirror 5), pulse width of an optical pulse is narrow and a peak power is very high. Therefore, a non-linear polarization rotation as a non-linear optical effect occurs only at a peak region of an optical pulse.

As a result, a portion of the above-mentioned optical pulse is separated by a PBS 12 and becomes an output optical pulse P50 from an oscillating section 2.

An output optical pulse P50 is generated in an oscillating section 2 in a self-oscillating manner; therefore, an output optical pulse P50 has a narrow pulse width with low timing jitter.

Cycle frequency of an output optical pulse P50 can be adjusted by controlling a position of a fine motion stage 13 and a coarse motion stage 14 which use piezo-elements to which a saturable absorber mirrors are attached in a passing direction of a beam.

If a stepping motor is used in a coarse motion stage 14, it is possible to vary a cavity length in a range of several 10 mm. If resonance basic frequency is 50 MHz, it is sufficiently possible to vary a cycle frequency of an optical pulse in a range of ±1 MHz.

Also, if a fine motion stage 13 is a piezo-stage, it is possible to vary a cavity length in a range of several hundreds of μm by a response frequency such as several 10 s of kHz; thus, varying width such as by several kHz is obtained as a cycle frequency.

In an optical amplifying section 3, an output optical pulse P50 which is emitted from a PBS 12 of an oscillator section 2 is united to an EDF 21 by a PBS 20, and an optical amplification is performed by an EDF 21 and an LD 22.

An output optical pulse P50 is amplified optically again by being reflected at a mirror 23.

Here, although polarization state of an optical pulse P50 is stabilized by a Faraday rotator 24, lenses 25 and 26, and wavelength plates 27 and 28, there is only one Faraday rotator 24; therefore, polarization of an optical pulse P50 which is reflected at a mirror 23 becomes orthogonal to a polarization direction which is incident to a PBS 20.

Therefore, an optical pulse P50 which is reflected at a mirror 23 passes through a PBS 20 and becomes an output optical pulse which is amplified optically and is emitted as an optical pulse P10.

A polarization direction controller 109 controls a polarization direction of an optical pulse P10 and emits a sampling optical pulse P4.

Here, a beam splitter 29 separates a portion of the above-mentioned optical pulse P10 and performs photoelectric conversion at a receptor 30 and outputs an obtained electrical signal as a monitor signal SS so as to monitor a cycle frequency of an optical pulse P10.

A controlling circuit 31 compares a cycle frequency of a monitor signal SS which indicates a cycle frequency of an optical pulse P10 with a cycle frequency of a sampling reference signal P2 which drives a passive mode-locked fiber ring laser 1 by a built-in phase locked loop (PLL) circuit and outputs a controlling signal for controlling a cavity length to a fine motion stage 13 and a coarse motion stage 14 so as not to cause a difference between the above-mentioned cycle frequencies.

By doing this way, a passive mode-locked fiber ring laser 1 can adjust a cavity length by controlling a fine motion stage 13 and a coarse motion stage 14 so as not make a difference between a controlling circuit 31 and a cycle frequency and generate an optical pulse row of an optical pulse P10 having a same cycle frequency as an input sampling reference signal P2.

Generally speaking, if a cycle frequency of a sampling optical pulse P4 is between "$(f_{sig}/n) - \Delta f$" and "$(f_{sig}/(n-1)) - \Delta f$", an optical sampling waveform measuring apparatus can handle a signal light P4 having various cycle frequencies, by varying a value of n (n is an integral number).

For example, when measuring an optical waveform of optical pulse of a signal light P8 to be measured having "10 GHz" of cycle frequency, when a sampling optical pulse P4 having "50 MHz" of cycle frequency is used, it is necessary to vary by 251 kHz; thus, a coarse motion stage 14 having the above-mentioned stepping motor can handle such varying operation.

That is, when $\Delta f$ is ignored and n is 200 (n is an integral number), if "10 GHz" as a cycle frequency of a signal light P8 to be measured is divided by 200, "50 MHz" of cycle frequency of a sampling optical pulse P4 is obtained.

Also, if "10 GHz" as a cycle frequency of a signal light P8 to be measured is divided by 199 (as a result of n−1=199), "50.251 MHz" of cycle frequency of a sampling optical pulse P4 is obtained.

Therefore, adjustment of a coarse motion stage 14 is possible in a range of one frequency division if varying operation within 251 kHz of cycle frequency by adjusting cavity length.

By doing this way, a passive mode-locked fiber ring laser 1 can generate a sampling optical pulse P4 which can respond to a signal light P8 to be measured having various cycle frequencies.

That is, an optical sampling waveform measuring apparatus according to the present invention can handle a signal light P8 to be measured having any cycle frequency by varying a "n" of a frequency division ratio and adjusting a cavity length by a coarse motion stage 14 when a cycle frequency of a sampling optical pulse P4 is synchronized to a cycle frequency to a signal light P8 to be measured.

Here, in a coarse motion stage 14, a cycle frequency of a sampling optical pulse P4 is synchronized to "$(f_{sig}/n) - \Delta f$" according to a cycle frequency of a signal light P8 to be measured as "$f_{sig}$" when measurement of a signal light P8 starts. Therefore, it is only necessary that a cavity length of a passive mode-locked fiber ring laser 1 be adjusted, and adjustment for synchronizing this input to a cycle frequency of a signal light P8 to be measured is not necessary to be performed in high speed response.

On the other hand, as a matter of fact, a cycle frequency of a signal light P8 to be measured and a cycle frequency of a sampling optical pulse P4 which is emitted from a passive mode-locked fiber ring laser 1 has a slight fluctuation.

Therefore, there occurs a shift of sampling timing of a signal light P8 during a waveform observation due to the above-mentioned fluctuation. Because of this, it is necessary to control a cycle frequency of a sampling optical pulse P4 accurately at high speed according to a cycle frequency of a signal light P8.

Here, width to be controlled is only a fluctuation as described above, large varying width of a cycle frequency of a sampling optical pulse P4 is not necessary. In contrast, quick response is required; therefore, a fine motion stage 13 such as the above-mentioned piezo-stage having several 10 s of kHz response speed is favorable.

By doing this way, an optical sampling waveform measuring apparatus according to the present invention can measure an optical waveform of a signal light P8 to be measured having an ultra-high speed signal waveform in low timing jitter and high timing resolution. Also, an optical sampling waveform measuring apparatus can measure an optical signal waveform having a signal speed on the order of terabits.

As described above, in an optical sampling waveform measuring apparatus according to the present invention, a passive mode-locked fiber ring laser 1 generates a sampling optical pulse P4 stably in a low timing jitter, and fine motion stage 13 adjusts a cavity length spontaneously so as to nullify a difference between a cycle frequency of a sampling optical pulse P4 of a passive mode-locked fiber ring laser 1 and a cycle frequency of a sampling reference signal P2 which is output from an electrical signal generator SG2 according to a time-wise fluctuation. Also, a cycle frequency of a sampling optical pulse P4 is controlled so as to be synchronized to a cycle frequency of a sampling reference signal P2. As described above, it is possible to measure an optical waveform with a low timing jitter and a high timing resolution. Also, it is possible to measure an optical waveform having a signal speed on the order of terabits.

As described above, although an embodiment of the present invention is explained with reference to the drawings, an optical sampling waveform measuring apparatus is not limited to the above-mentioned embodiment. Any optical sampling waveform measuring apparatus is included in the present invention as long as design change is within the scope of purposes of the present invention.

Figure 4:
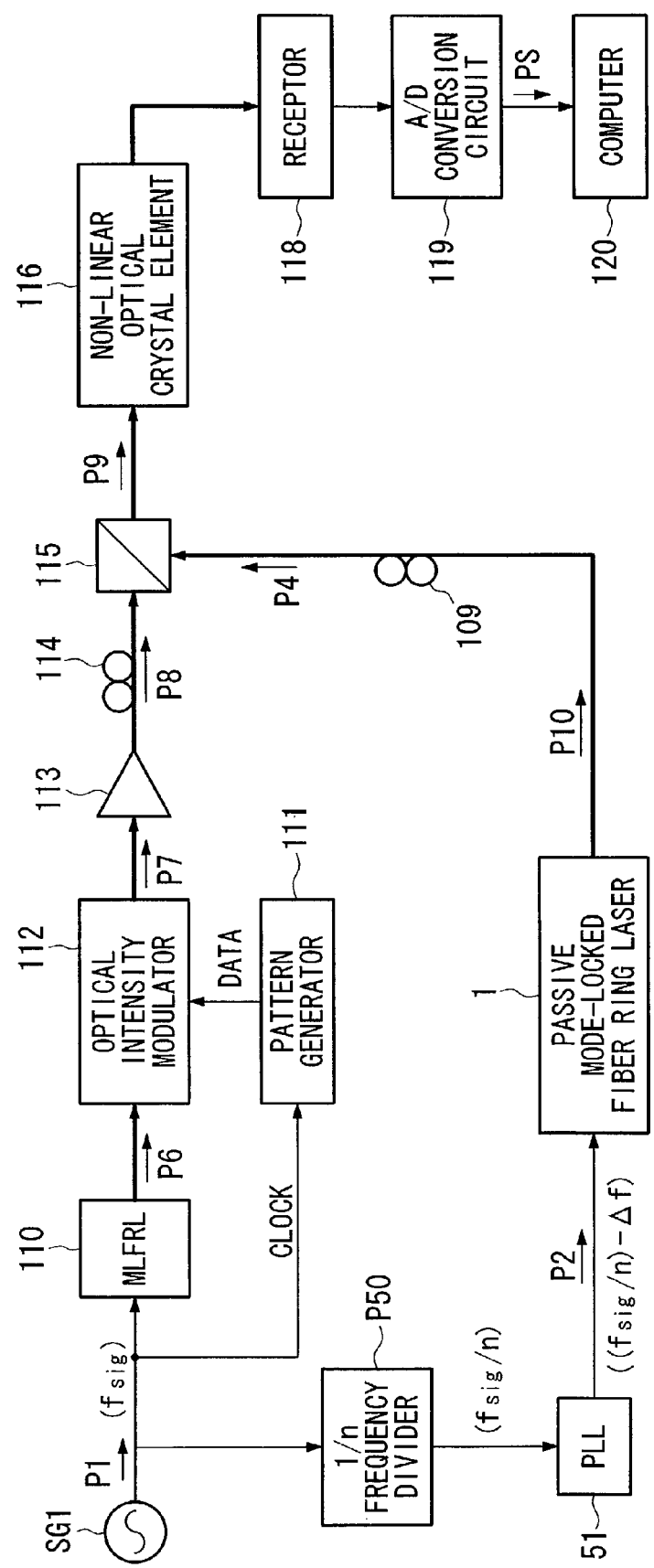
FIG. 4 is a block diagram showing a second embodiment of an optical sampling waveform measuring apparatus.

For example, a second embodiment of the present invention may be an optical sampling waveform measuring apparatus shown in FIG. 4. FIG. 4 is a block diagram of a second embodiment of an optical sampling waveform measuring apparatus according to the present invention.

In a second embodiment as shown in FIG. 4, the same reference numerals are put to the same structures in a first embodiment shown in FIG. 1.

A second embodiment of an optical sampling waveform measuring apparatus has almost the same structure as a first embodiment. Therefore, only different aspects are explained here.

A second embodiment of an optical sampling waveform measuring apparatus is characterized in that a 1/n divider 50 and a PLL 51 are provided instead of the electrical signal generator SG2 in the first embodiment.

That is, in the second embodiment, a sampling reference signal P2 which is supplied to a passive mode-locked fiber ring laser 1 is generated by performing 1/n frequency division to a cycle frequency $f_{sig}$ of a signal light P1 to be measured for exciting a source of signal to be measured and giving a delay sweeping frequency difference Δf by a PLL 51.

By doing this way, it is possible to handle a signal light to be measured having any cycle frequency by varying a frequency division ratio "n" of a 1/n frequency divider 50. Also, it is possible to perform a frequency division automatically by varying a frequency division ratio "n" which divides a cycle frequency $f_{sig}$ of a signal P1 to be measured by a computer 120.

Also, a second embodiment of an optical sampling waveform measuring apparatus has the same effects as those of the first embodiment.

What is claimed is:

1. An optical sampling waveform measuring apparatus comprising:

a first electrical signal generator (SG1) for generating electric signals having a cycle frequency $f_{sig}$;

a mode-locked fiber ring laser (110) which is pumped by the electric pulses P1, the mode-locked fiber ring laser (110) generating optical pulses P6 synchronous with clock signals of the electric pulses P1;

a pattern generator (111) for outputting a predetermined pattern of data signal rows, each of the data signal rows consisting of at least "0" (zero) and "1" (one), the data signal rows being synchronous with the clock signals of the electric pulses P1;

an optical intensity modulator (112) for modulating the optical pulses P6 based on the predetermined pattern, and outputting optical pulses P7;

an optical amplifier (113) for amplifying the optical pulses P7;

a polarization controller (114) for controlling a polarization direction of the optical pulses P7, and outputting optical pulses P8 having the cycle frequency $f_{sig}$;

a second electrical signal generator (SG2) for generating electric sampling pulses P2 having the cycle frequency ($f_{sig}$/n−Δf) synchronous with the electric pulses P1;

a passive mode-locked fiber ring laser (1) for emitting optical sampling pulses P10 having the cycle frequency ($f_{sig}$/n−Δf) which corresponds to the electric sampling pulses P2;

a polarization direction controller (109) for controlling a polarization direction of the optical sampling pulses P10, and outputting optical sampling pulses P4 having the cycle frequency $f_{sig}$;

a polarization beam splitter (115) for mixing the optical pulses P8 and the optical sampling pulses P4, and outputting optical pulses P9;

a non-linear optical crystal element (116) for generating sum-frequency optical pulses of the optical pulses P4 and P8, a phase of the optical sampling pulses P4 and a phase of the optical pulses P8 being matched in the optical pulses P9;

a receptor (118) consisting of photo-electric converting elements, converting the sum-frequency optical pulses into detection signals (PS);

an A/D converter (119) for converting a peak voltage of the detection signals (PS) into digits; and a computer (120) for calculating the digits, generating eye-patterns, displaying images of the eye-patterns in a display section, and evaluating a waveform of the optical pulses P7, wherein n is an integer, and Δf is a frequency range.

2. An optical sampling waveform measuring apparatus according to claim 1, wherein a reflecting mirror in a resonator in the passive mode-locked fiber ring laser is made of a saturable absorber.

3. An optical sampling waveform measuring apparatus according to claim 2, wherein a saturable absorber in a passive mode-locked fiber ring laser is a semiconductor saturable absorber.

4. An optical sampling waveform measuring apparatus according to any one of claims 2 to 3, wherein a cavity length varying device which adjusts the cavity length is provided in a passive mode-locked fiber ring laser.

5. An optical sampling waveform measuring apparatus according to claim 4, wherein a cavity length varying device in a passive mode-locked fiber ring laser comprises a coarse motion adjusting section which performs coarse varying operation and a fine motion adjusting section which performs fine varying operation.

6. An optical sampling waveform measuring apparatus according to claim 1, wherein $\Delta f$ is in a range of several hundreds of Hz to several kHz, and the cycle frequency of the optical sampling pulses P4 is indicated by a formula $(f_{sig}/f - \Delta f)$.

7. An optical sampling waveform measuring apparatus according to claim 1, wherein the second electrical signal generator (SG2) generates electric pulses having a cycle frequency synchronous with the electric pulses P1, which are outputted from the first electrical signal generator (SG1), the cycle frequency being indicated by the formula $f_{sig}/n - \Delta f$.

* * * * *